US010634937B2

United States Patent
Miyoshi

(10) Patent No.: US 10,634,937 B2
(45) Date of Patent: Apr. 28, 2020

(54) SEMITRANSPARENT LENS, SUNGLASS, AND SEMITRANSPARENT LENS MANUFACTURING METHOD

(71) Applicant: Miyoshi Industrial Enterprise Inc., Fukui (JP)

(72) Inventor: Kazuyuki Miyoshi, Fukui (JP)

(73) Assignee: Miyoshi Industrial Enterprise Inc., Fukui (JP)

(*) Notice: Subject to any disclaimer, the term of this patent is extended or adjusted under 35 U.S.C. 154(b) by 0 days.

(21) Appl. No.: 15/828,143

(22) Filed: Nov. 30, 2017

(65) Prior Publication Data

US 2018/0275430 A1 Sep. 27, 2018

(30) Foreign Application Priority Data

Mar. 23, 2017 (JP) ................................. 2017-058253

(51) Int. Cl.
*G02C 7/10* (2006.01)
*G02C 7/12* (2006.01)
*G02B 1/08* (2006.01)
*G02B 1/10* (2015.01)
*G02B 1/118* (2015.01)
*G02B 1/14* (2015.01)

(52) U.S. Cl.
CPC ............... *G02C 7/108* (2013.01); *G02B 1/08* (2013.01); *G02B 1/10* (2013.01); *G02B 1/118* (2013.01); *G02B 1/14* (2015.01); *G02C 7/12* (2013.01)

(58) Field of Classification Search
CPC . G02C 7/104; G02C 7/10; G02C 7/12; G02C 7/101; G02C 7/105; G02C 7/16;
(Continued)

(56) References Cited

U.S. PATENT DOCUMENTS

2008/0192350 A1* 8/2008 Yamada ................. C03C 17/23
359/582
2009/0219620 A1* 9/2009 Yamada ................. G02B 1/115
359/586
(Continued)

FOREIGN PATENT DOCUMENTS

EP 1895336 A1 3/2008
EP 2816378 A1 * 12/2014 ............... C08J 7/04
(Continued)

OTHER PUBLICATIONS

EP 17 20 4049 Extended European Search Report dated Jun. 1, 2018.
(Continued)

*Primary Examiner* — William R Alexander
*Assistant Examiner* — Sharrief I Broome
(74) *Attorney, Agent, or Firm* — K&L Gates LLP; Louis C. Cullman; Georgia N. Kefallinos

(57) ABSTRACT

An objective of the present disclosure is to ensure a sufficient visual field of the exterior as viewed by a lens wearer, the lens having a highly ornamental matte-colored visual appearance.
A semitransparent lens 11 has a lens substrate 12, a reflection layer 13, a hard-coat layer 15, and an intermediate layer 14. A surface of the lens substrate 12 has fine irregularities. The reflection layer 13 is disposed on the lens substrate 14. The hard-coat layer 15 is disposed on the reflection layer 13. The intermediate layer 14 is arranged between the lens substrate 12 and the reflection layer 13, and is formed from a material having a difference in refractive index less than or equal to 0.03 relative to the hard-coat layer 15. Haze value of the semitransparent lens 11 is in a range of 0.4 to 2.5 as measured in accordance with ISO 12312-1 according to the test method of ISO 12317.97.

13 Claims, 6 Drawing Sheets

(58) Field of Classification Search
CPC .... G02C 2202/16; G02C 11/10; G02C 3/003;
G02C 7/02; G02C 2200/02; G02C 7/108;
G02C 9/00; G02C 11/12; G02C 2200/08;
G02C 5/00; G02C 7/102; G02C 11/00;
G02C 7/022; G02C 7/086; G02B 1/04;
G02B 1/041; G02B 1/11; G02B 1/115;
G02B 5/223; G02B 5/23; G02B 1/10;
G02B 5/208; G02B 1/14; G02B
2027/0118; G02B 27/0172; G02B 5/22;
G02B 5/28; G02B 5/3083; G02B 1/005;
G02B 1/118; G02B 2027/0112; G02B
2027/0138; G02B 2027/014; G02B
2027/0178
See application file for complete search history.

(56) References Cited

U.S. PATENT DOCUMENTS

2014/0016204 A1* 1/2014 Hakuta ................. G02B 1/118
359/601

2016/0306195 A1   10/2016  Miyoshi
2017/0068106 A1    3/2017  Murayama et al.
2017/0160566 A1    6/2017  Tanaka et al.

FOREIGN PATENT DOCUMENTS

| | | | |
|---|---|---|---|
| EP | 2816378 A1 | 12/2014 | |
| JP | 11-052305 A | 2/1999 | |
| JP | 2005313027 A | * 11/2005 | |
| JP | 2016-206264 | 12/2016 | |
| JP | 2005-313027 | 11/2017 | |
| KR | 2017-0027713 A | 3/2017 | |
| WO | 2009/054287 A1 | 4/2009 | |

OTHER PUBLICATIONS

Office Action for European Patent Application No. 17204049.5 dated Jul. 19, 2019.

* cited by examiner

| # SEMITRANSPARENT LENS, SUNGLASS, AND SEMITRANSPARENT LENS MANUFACTURING METHOD

CROSS-REFERENCE TO RELATED APPLICATION

This application claims the benefit of Japanese Patent Application No. 2017-058253, filed on Mar. 23, 2017, the entire disclosure of which is incorporated by reference herein.

FIELD

This application relates generally to a semitransparent lens, sunglasses, and a semitransparent lens manufacturing method. This application specifically relates to a semitransparent lens used in fashion glasses such as sunglasses, and to sunglasses and a manufacturing method for the semitransparent lens.

BACKGROUND

Visual impact and ornamentation of fashion glasses such as sunglasses are increased by the imparting of a white-tinted external appearance, such as that of a mirror, or a frosted-darkened external appearance. Conventionally fashion glasses having excellent ornamentation in this manner are mainly colored sunglasses. Semitransparent lenses that reflect part of incident visible light are used in the colored sunglasses.

In contrast, in order to manufacture non-colored sunglasses that reflect all of the visible light, a type of lenses is required that reflects all colors of light. Thus, only sunglasses using partially-reflecting silver-mirror lenses have been commercially marketed as such sunglasses. Thus, great commercial demand exists for fashion glasses that have further excellent ornamentation without an external appearance such as that of the totally reflective mirror.

Thus semitransparent lenses are developed, as lenses used in fashion glasses that are more highly ornamental, and that enable sufficient visual recognition from the backside while the external appearance of the semitransparent lenses is white-colored, rather than mirror-like, when viewed from the front (see Patent Literature 1). In order to prevent lowering of visual recognition by internal reflection of incident light in these semitransparent lenses, a reflection layer is formed to cause scattering of light rays in the interior of the semitransparent lenses.

SUMMARY

However, these semitransparent lenses are deficient in that an incident light ray is refracted by the reflection layer so that the exterior appears distorted. Furthermore, the semitransparent lenses have a problem of hazy appearance of the exterior and great haze due to the reflection layer.

The present disclosure is developed in consideration of the aforementioned circumstances, and thus an objective of the present disclosure is to provide a semitransparent lens, sunglasses, and a semitransparent lens manufacturing method that enable securing of a sufficient visual field of the exterior as seen by the eyes of a lens user, while the lenses have a highly ornamental frosted external appearance.

An objective of the present disclosure is also to provide the semitransparent lens, the sunglasses, and the semitransparent lens manufacturing method that can prevent occurrence of interference fringes when light strikes the lens surface, while securing a sufficient visual field of the exterior as seen by the eyes of a lens user.

In order to achieve the aforementioned objective, the semitransparent lens according to a first aspect of the present disclosure includes:

a lens substrate having fine irregularities on a surface of the lens substrate;
a reflection layer disposed on the lens substrate;
a hard-coat layer disposed on the reflection layer; and
an intermediate layer disposed between the lens substrate and the reflection layer, the intermediate layer being a substance having a difference in refractive index of 0.03 or less relative to the hard-coat layer.

A haze value of the semitransparent lens is in a range of 0.4 to 2.5 as measured in conformance with ISO 12312-1.

A portion of the surface of the lens substrate may be free of the fine irregularities.

A difference in refractive index between the hard-coat layer and the intermediate layer may be less than 0.02.

Visible light transmittance may be in a range of 10 percent to 35 percent.

The lens substrate may be formed from at least one resin selected from a group that includes a polycarbonate, a poly (methyl methacrylate), a polyamide, a polyester, a polysiloxane, a polystyrene, or a poly(cycloolefin).

Thickness of the hard-coat layer may be within a range of 2 microns to 4 microns, and the hard-coat layer may include a primer.

The hard-coat layer may include at least 2 types of primers, and the primers may form a layered structure.

In order to achieve the aforementioned objective, sunglasses according to a second aspect of the present disclosure include semitransparent lenses according to the first aspect.

In order to achieve the aforementioned objective, a manufacturing method according to a third aspect of the present disclosure is a method for manufacture of the semitransparent lens according to the first aspect, the method including:

inserting a polarizing sheet into a mold for forming a surface having fine irregularities on the lens substrate and thereafter insert molding of thermoplastic resin to form the lens substrate having the fine irregularities;
forming the reflection layer on the lens substrate having the fine irregularities formed thereon; and
forming at least the hard-coat layer on the reflection layer.

The step of forming the lens substrate having the fine irregularities may be a step of, by molding pressure during insert molding of the thermoplastic resin, pressing the polarizing sheet against the inner surface of the mold to press the polarizing sheet, which is previously inserted between inner faces of the mold having the irregularities corresponding to the fine irregularities, to transfer the fine irregularities to the surface of the polarizing sheet.

A layer of a thermoplastic resin having a refractive index that has a difference of 0.03 or more from that of the hard-coat layer may be further formed on the surface of the polarizing sheet having the irregularities corresponding to the fine irregularities of the mold.

In order to achieve the aforementioned objective, the semitransparent lens manufacturing method according to a fourth aspect of the present disclosure is the semitransparent lens manufacturing method according to the first aspect, and includes:

molding a thermoplastic resin into the lens substrate by use of a mold having an inner surface shape for forming the fine irregularities on a surface of the lens substrate;

forming the reflection layer on the surface having the fine irregularities of the molded lens substrate; and forming at least the hard-coat layer on the reflection layer.

Further, the semitransparent lens manufacturing method may include forming an intermediate layer between the lens substrate and the reflection layer, the intermediate layer having a difference in refractive index relative to the hard-coat layer less than or equal to 0.03.

The present disclosure enables sufficient securing of a visible field of the exterior by the eyes of the lens user while the lenses have a highly ornamental matte-colored visual appearance. Further, while protecting the reflection layer and obtaining a sufficient visual field of the exterior for the eye of the lens user, the present disclosure enables prevention of the occurrence of interference fringes when light strikes the lens surface.

BRIEF DESCRIPTION OF THE DRAWINGS

A more complete understanding of this application can be obtained when the following detailed description is considered in conjunction with the following drawings, in which.

DETAILED DESCRIPTION

Embodiment 1

Figure 1:
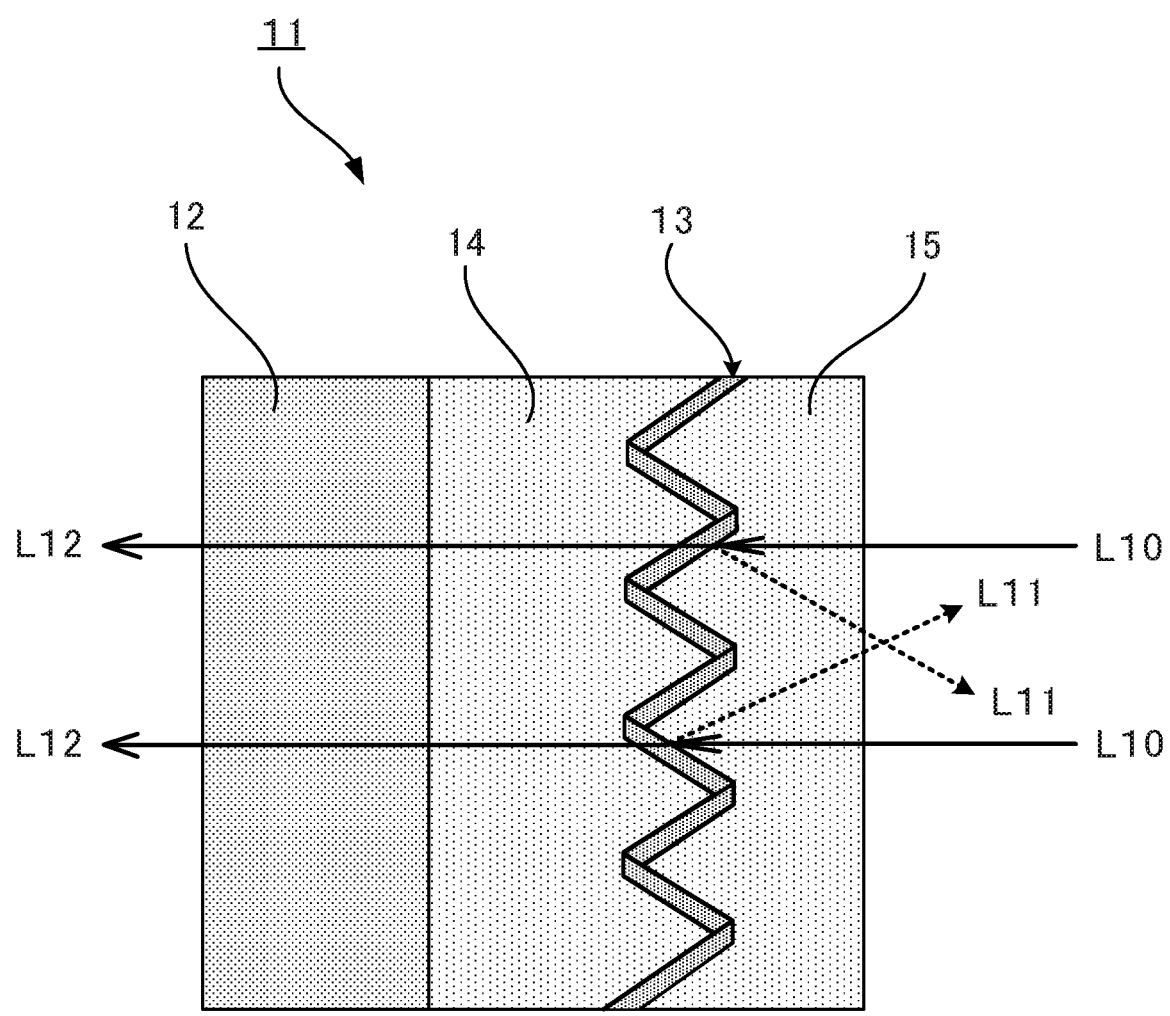
FIG. 1 is a schematic drawing illustrating a cross section of a semitransparent lens according to Embodiment 1 of the present disclosure.

Firstly, a semitransparent lens 11 according to Embodiment 1 of the present disclosure is described with reference to FIG. 1. FIG. 1 is a schematic drawing illustrating a cross section of the semitransparent lens 11 according to Embodiment 1 of the present disclosure.

As illustrated in FIG. 1, the semitransparent lens 11 according to Embodiment 1 of the present disclosure specifically includes a lens substrate 12, a reflection layer 13, an intermediate layer 14 arranged between the lens substrate 12 and the reflection layer 13, and a hard-coat layer 15. This semitransparent lens 11 is configured by stacking, in order, the lens substrate 12, the intermediate layer 14, the reflection layer 13, and the hard-coat layer 15. In Embodiment 1, the intermediate layer 14 is formed by an acrylic resin layer that is a portion of a polycarbonate (PC) polarizing sheet that is a constituent element of the insert-molded semitransparent lens 11.

That is to say, in the semitransparent lens 11, the polycarbonate polarizing sheet forms the intermediate layer 14 and a portion of the lens substrate 12 that is this constituent element. More specifically, this polarizing sheet is a polarizing sheet that sandwiches both surfaces of a polarizing membrane between polycarbonate resin sheets, and the polarizing sheet further has an acrylic resin layer arranged at the exterior face of one of the polycarbonate resin sheets.

The surface of the lens substrate 12 has fine irregularities. More specifically, the fine irregularities are formed in the surface of the intermediate layer 14 stacked against the lens substrate 12. Here, the fine irregularities may be omitted from a portion of the overall surface of the lens substrate 12. That is to say, a portion of the surface of the lens substrate 12 may have a region in which the fine irregularities are not arranged. For example, in a lens substrate 12 having a peripheral shape that is circular, square, or the like, the location of formation of the fine irregularities may be only a central portion of the surface and not both sides of the central portion of the surface. Further the location of formation of the fine irregularities may be only the central portion and not the outer peripheral portion of the surface of the lens substrate 12.

The material forming the major part of the lens substrate 12 is a polycarbonate (PC) molding. However, the material forming the major part of the lens substrate 12 is not limited to polycarbonate. For example, the lens substrate 12 may be formed from at least one resin selected from among a group including polycarbonate, a poly (methyl methacrylate), a polyamide, a polyester, a polysiloxane, a polystyrene, and a poly(cycloolefin).

The reflection layer 13 is disposed on the surface of the lens substrate 12. More specifically, the reflection layer 13 is disposed on the fine irregularities formed in the surface of the intermediate layer 14 stacked on the lens substrate 12. The reflection layer 13 functions as a mirror layer that reflects a portion, such as 10 percent to 20 percent, of incident light and transmits the remaining incident light. Since the reflection layer 13 has a uniform nano-level thickness, the thickness may be considered to be ignorable. Thus, when the difference in refractive index between the intermediate layer 14 and the hard-coat layer 15 is large, haze is caused by refraction of transmitted light at this interfacial surface. Here, "haze (%)" is an indicator concerning transparency of a film or the like, and indicates turbidity (cloudiness). Haze is found from the fraction of scattered transmitted light relative to total transmitted light, and thus haze is affected by roughness of the surface.

The intermediate layer 14 is arranged between the lens substrate 12 and the reflection layer 13, and is a material that has a difference in refractive index less than or equal to 0.03 relative to the hard-coat layer 15. In Embodiment 1, the intermediate layer 14 is formed by the acrylic resin layer arranged on one side of the PC polarizing sheet in the aforementioned manner.

The hard-coat layer 15 is arranged on the reflection layer 13. Thickness of the hard-coat layer 15 is within a range from 2 microns to 4 microns. The hard-coat layer 15 is formed, for example, from an acrylic hard coat and a primer coated on the surface of the acrylic hard coat. The utilized primer has a refractive index (target value) of 1.55.

Specific examples of materials that may be used as the primer include polyurethane-based resin such as urethane resin, epoxy resin, acrylic resin, and a polysiloxane, and the like. The primer forming the hard-coat layer 15 is not limited to a single type, and two or more primer materials may be used. These two or more primer materials may form a layered structure. Specifically, the hard-coat layer 15 may be formed from a polyurethane-type resin layer contacting the reflection layer 13 and a polysiloxane layer formed on the polyurethane-type resin layer.

Here, refractive index of the acrylic hard coat is in the vicinity of 1.55, and is in the range of 1.53 to 1.56. That is to say, the refractive index difference between the acrylic hard coat and the primer is less than 0.02. Thus, even though the primer is coated on the acrylic hard coat, the refractive index values are nearly the same, and thus there is hardly any generation of interference fringes, and the optical characteristics are nearly unchanged. Thus, the refractive index of the hard-coat layer 15 is within the range from 1.53 to 1.56.

The visible light transmittance of the semitransparent lens 11 configured in the aforementioned manner is within the range from 10 percent to 35 percent.

In this manner, the semitransparent lens 11 according to Embodiment 1 has a configuration that:

arranges the intermediate layer 14 formed by the acrylic resin layer, that is a portion of the PC polarizing sheet, between the lens substrate 12 and the reflection layer 13, and forms the hard-coat layer 15 having the acrylic hard coat.

Further, the difference in refractive index between the hard-coat layer 15 having the acrylic hard coat and the intermediate layer 14 formed from the acrylic resin layer that is a portion of the PC polarizing sheet is less than or equal to 0.03. The difference in refractive index between the hard-coat layer 15 and the intermediate layer 14 may be less than 0.02.

As illustrated in FIG. 1, in the semitransparent lens 11 having such a configuration, among visible light L10 incident on the semitransparent lens 11 from the exterior, a portion becomes reflected light L11 reflected by the reflection layer 13, and the visible light L10 that is not reflected by the reflection layer 13 enters the lens substrate 12 from the intermediate layer 14.

Here, the difference in refractive index is extremely small between the hard-coat layer 15 having the acrylic hard coat and the intermediate layer 14 formed from the acrylic layer that is a portion of the PC polarizing sheet. Thus, most of the visible light L10 entering the lens substrate 12 from the intermediate layer 14 does not scatter, but rather passes through the semitransparent lens 11 as transmitted light L12. Thus, the haze value of the semitransparent lens 11 is controlled at a very small value, and visibility of the exterior when the semitransparent lenses 11 are worn is greatly improved.

However, when the semitransparent lens 11 is viewed from the exterior, a portion of the visible light is scattered by the surface of the reflection layer 13 of the interior of the semitransparent lens 11, and thus the external appearance of the surface of the semitransparent lens 11 is semitransparent and has matte coloration.

In this manner, the semitransparent lens 11 according to Embodiment 1 has a highly artistic matte coloration that appears natural as viewed from the front, and obtains a sufficient visual field of the exterior as viewed from the eyes of the wearer. Thus, the semitransparent lenses 11 may be used as lenses for fashion eyeglasses including sunglasses and the like.

Figure 2:
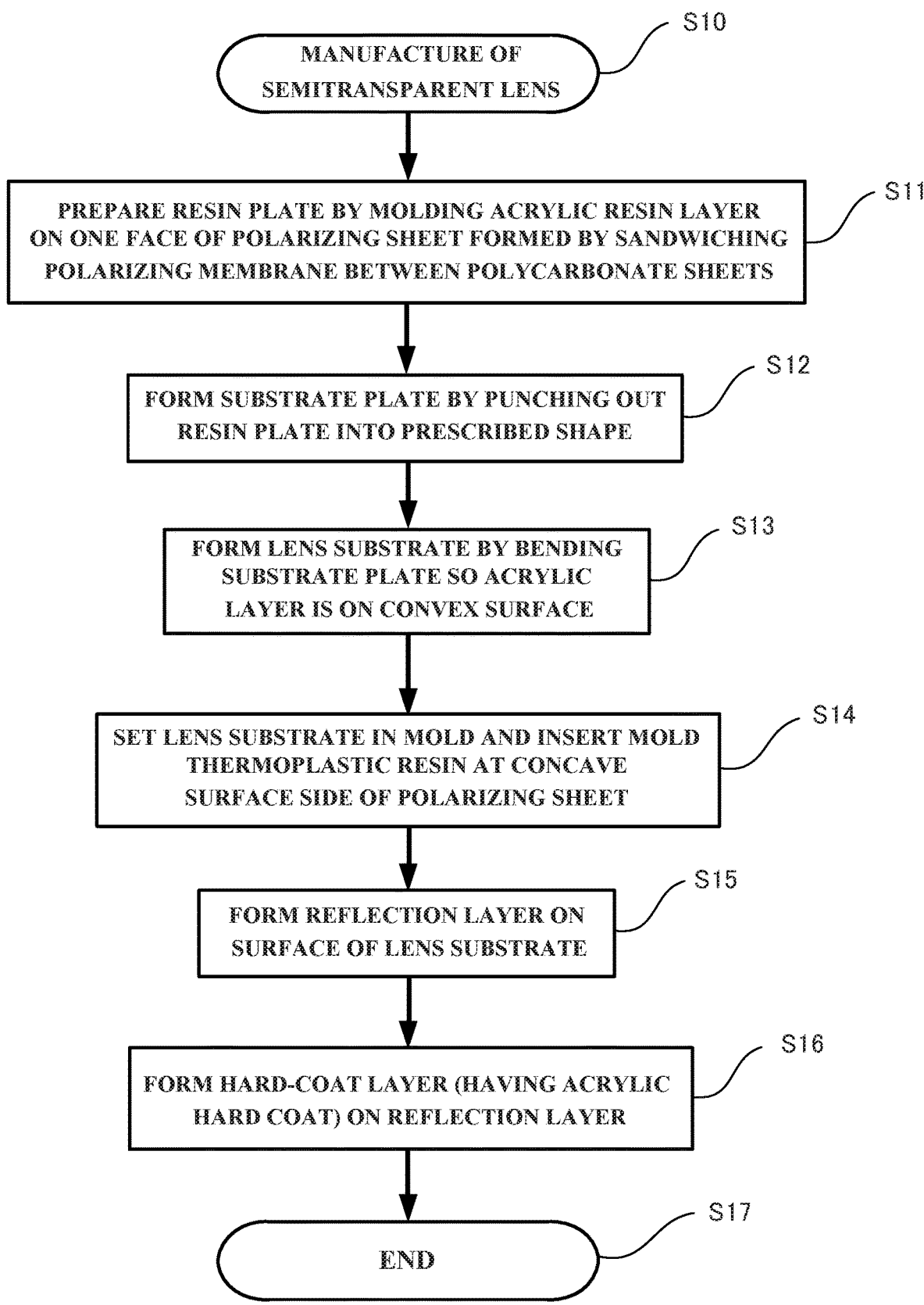
FIG. 2 is a flowchart illustrating a procedure of a semitransparent lens manufacturing method according to Embodiment 1 of the present disclosure.

The method of manufacture of the semitransparent lens 11 according to Embodiment 1 of the present disclosure is described next with reference to FIG. 2. FIG. 2 is a flowchart illustrating a series of steps in the method of manufacture of the semitransparent lens 11 according to Embodiment 1.

Firstly, a resin plate is prepared by further providing the acrylic resin layer on one surface of the polarizing sheet in which both faces of the polarizing membrane are sandwiched by polycarbonate resin sheets in the aforementioned manner (step S11). Here, an obtainable commercial product having such a configuration may be used as the resin plate without modification, or the resin plate may be manufactured by bonding the acrylic resin layer to the polarizing sheet. Further, the polarizing sheet may be manufactured by bonding polycarbonate resin sheets to both surfaces of the polarizing membrane, or a commercially available polarizing sheet may be used in which the polycarbonate resin sheets already sandwich the polarizing membrane.

Thereafter, a substrate plate is formed from this resin plate by punching out (step S12) to form a certain shape. Further, a lens substrate is formed by bending the substrate plate so that the acrylic resin layer becomes the convex surface (step S13). Thereafter, the lens substrate is set within the mold, and the thermoplastic resin is insert-molded at the concave surface side of the polycarbonate polarizing sheet (step S14). The utilized thermoplastic resin is a polycarbonate, a poly(methyl methacrylate), a polyamide, a polyester, a polysiloxane, a polystyrene, a poly(cycloolefin), or the like.

At this time, by pressure of insert molding of the thermoplastic resin against the concave surface side of the lens substrate, the acrylic resin layer forming the convex surface of the lens substrate is pressed against the mold surface, and the fine irregularities of the mold surface are transferred to the convex surface of the lens substrate. Thus, a matte portion including fine irregularities is formed in the surface of the lens substrate.

Here, surface roughness (Ra) of fine irregularities of the mold surface is adjusted by arranging the matte surface (irregularities surface) on the surface of the mold. Methods for forming on the surface of the mold the matte surface having suitable surface roughness include blast processing, laser processing, etching by an acidic liquid, and the like.

Thereafter, the reflection layer 13 is formed on the lens substrate 12 (step S15), and furthermore, the hard-coat layer 15 is formed on the reflection layer 13 (step S16). This hard-coat layer 15 includes the acrylic hard coat and the primer. Manufacturing of the semitransparent lens 11 is completed (step S17) by the above processing.

Embodiment 2

Figure 3:
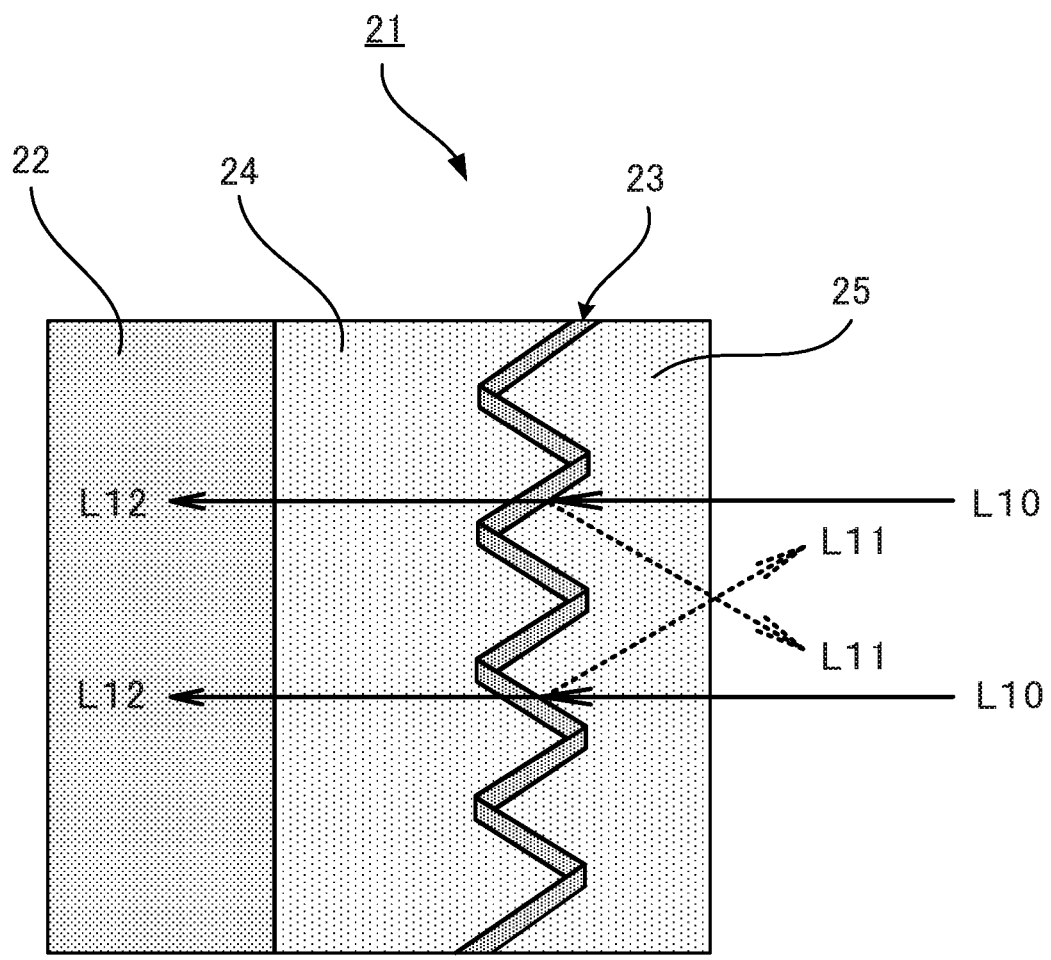
FIG. 3 is a schematic drawing illustrating a cross section of a semitransparent lens according to Embodiment 2 of the present disclosure.

Next, a semitransparent lens 21 according to Embodiment 2 of the present disclosure is described with reference to FIG. 3. FIG. 3 is a schematic drawing illustrating a cross section of the semitransparent lens 21 according to Embodiment 2 of the present disclosure. Further, in contrast to Embodiment 1, the hard-coat layer 25 does not have the acrylic hard coat in the semitransparent lens 21 according to Embodiment 2.

As illustrated in FIG. 3, the semitransparent lens 21 of Embodiment 2 has a lens substrate 22, a reflection layer 23, an intermediate layer 24 arranged between the reflection layer 23 and the lens substrate 22, and a hard-coat layer 25, in the same manner as the semitransparent lens 11 of Embodiment 1.

In contrast to Embodiment 1, the polycarbonate polarizing sheet forming the constituent element of the semitransparent lens 21 in Embodiment 2 does not have the acrylic resin layer formed on one surface. Further, the hard-coat layer 25 is formed just from the primer and does not have the acrylic hard coat. The utilized primer of the hard-coat layer 25 has a refractive index of 1.55.

In this manner, in contrast to Embodiment 1, the acrylic hard coat is not provided in the hard-coat layer 25 of the semitransparent lens 21 according to Embodiment 2. Further, a polarizing sheet is used that sandwiches both surfaces of the polarizing membrane only by the polycarbonate resin sheets, and that is not provided with the acrylic resin layer.

That is to say, the semitransparent lens 21 has a configuration in which a polycarbonate resin sheet (polycarbonate resin layer) that is part of the PC polarizing sheet is provided between the lens substrate 22 and the reflection layer 23 as the intermediate layer 24.

However, due to formation of the intermediate layer 24 between the lens substrate 22 and the reflection layer 23, visible light entering the semitransparent lens 21 from the exterior undergoes very little light scattering in the interior of the semitransparent lens 21. Thus, the haze value of the semitransparent lens 21 is low, and visibility of the exterior when wearing the lenses is improved.

Further, although the refractive index of the polycarbonate resin is generally lower than the refractive index of 1.55 of the primer forming the hard-coat layer 25, the polycarbonate resin forming the intermediate layer 24 in Embodiment 2 has a refractive index of 1.52 to 1.54, and the difference in refractive index relative to the hard-coat layer 25 is less than or equal to 0.03.

However, when the semitransparent lens 21 is viewed from the exterior, visible light is scattered by the surface of the reflection layer 23 arranged in the interior of the semitransparent lens 21, and thus the external appearance of the surface of the semitransparent lens 21 has a semitransparent matte coloration.

Further, the hard-coat layer 25 of the semitransparent lens 21 of Embodiment 2 has no acrylic hard coat. Further, a PC polarizing sheet having no acrylic resin layer on one surface is used as a part of the semitransparent lens 21. Thus, the manufacturing process of the semitransparent lens 21 is simplified, and manufacturing cost is lowered.

In the aforementioned manner, the semitransparent lens 21 according to Embodiment 2 suppresses manufacturing cost, has a natural external appearance when viewed from the front of the semitransparent lens 21, has a highly artistic matte coloration, and secures for the eyes of the wearer a sufficient visual field of the exterior. Thus, the semitransparent lenses 21 can be used with advantage for fashion eyeglasses including sunglasses and the like.

Figure 4:
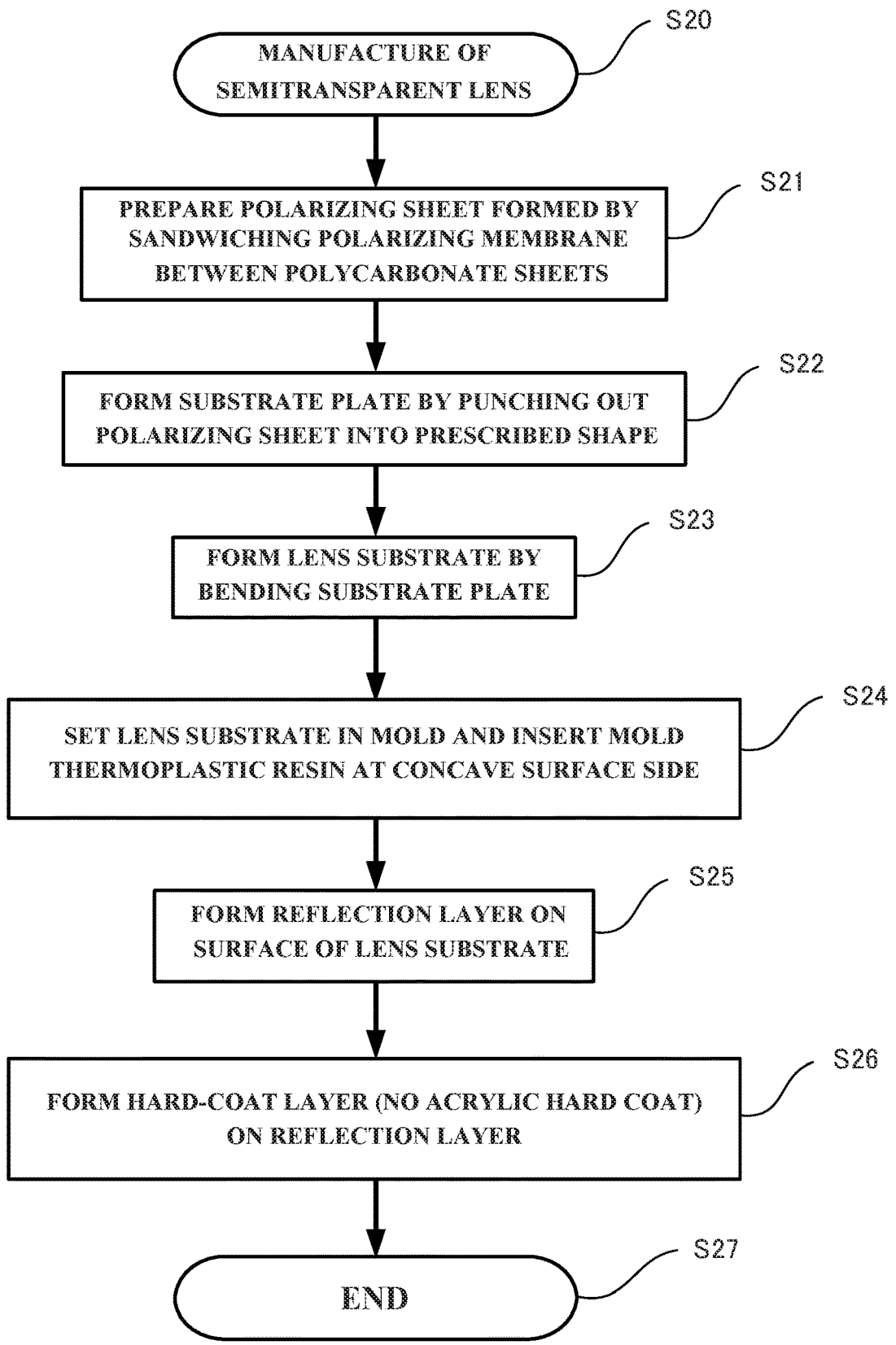
FIG. 4 is a flowchart illustrating a procedure of a semitransparent lens manufacturing method according to Embodiment 2 of the present disclosure.

The method of manufacture of the semitransparent lens 21 according to Embodiment 2 of the present disclosure is described next with reference to FIG. 4. FIG. 4 is a flowchart illustrating a series of steps in the method of manufacture of the semitransparent lens 21 according to Embodiment 2.

Firstly, a polarizing sheet is prepared by using polycarbonate resin sheets to sandwich both faces of the polarizing membrane in the aforementioned manner (step S21). Here, the polarizing sheet may be manufactured by bonding polycarbonate resin sheets to both surfaces of the polarizing membrane, or a commercially available polarizing sheet may be used in which the polycarbonate resin sheets already sandwich the polarizing membrane. Thereafter, a substrate plate is formed in a prescribed shape by punching out the polarizing sheet (step S22). Further, a lens substrate is formed by bending the substrate plate (step S23).

Thereafter, the lens substrate is set within the mold such that the convex surface of the lens substrate faces the surface of the mold having the fine irregularities. Then the thermoplastic resin is insert-molded at the concave surface side of the lens substrate (step S24). At this time, the pressure of the thermoplastic resin insert-molded into the concave surface side of the lens substrate presses the convex surface of the lens substrate against the mold surface, and the fine irregularities of the mold surface are transferred to the convex surface of the lens substrate. By this method, a matte portion including fine irregularities is formed in the surface of the lens substrate.

Here, surface roughness (Ra) of fine irregularities of the mold surface is adjusted by arranging the matte surface (irregularities surface) on the surface of the mold. Methods for forming in on the surface of the mold the matte surface having suitable surface roughness include blast processing, laser processing, etching by an acidic liquid, and the like.

Thereafter, the reflection layer is formed on the lens substrate (step S25). Furthermore, the hard-coat layer is formed on the reflection layer (step S26). In contrast to Embodiment 1, this hard-coat layer is formed only from the primer. That is to say, the hard-coat layer does not include the acrylic hard coat. Manufacturing of the semitransparent lens 11 is completed (step S27) by the above processing.

In the same manner as that of the manufacturing method according to Embodiment 1, insertion of a multi-functional sheet is not used, but rather the matte surface is provided directly on the surface of the resin-molding mold as the matte processing of the mold. Methods for forming on the surface of the mold the matte surface having suitable surface roughness include blast processing, laser processing, etching by an acidic liquid, and the like.

Embodiment 3

Figure 5:
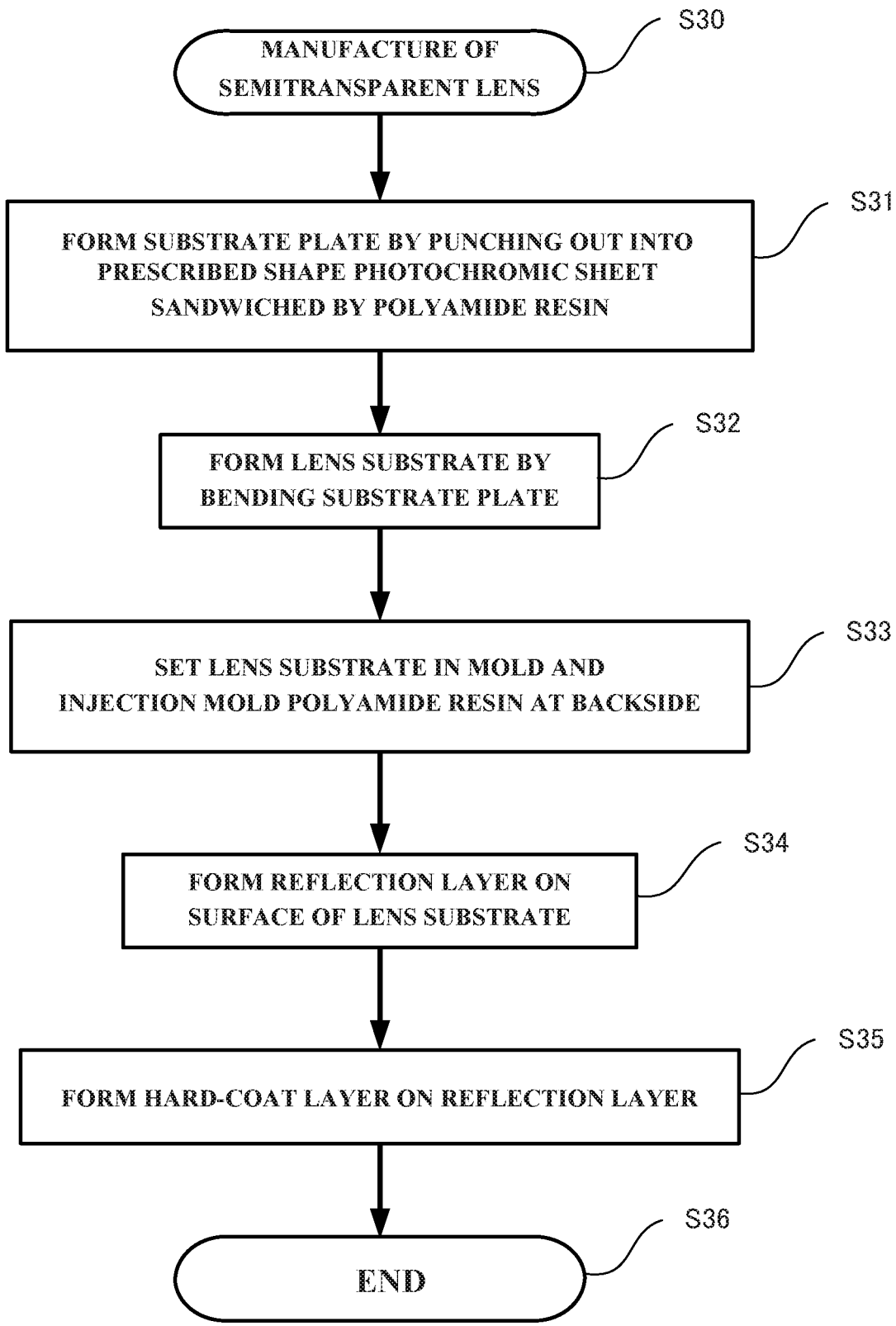
FIG. 5 is a flowchart illustrating a procedure of a semitransparent lens manufacturing method according to Embodiment 3 of the present disclosure.

The method of manufacture of the semitransparent lens according to Embodiment 3 of the present disclosure is described next with reference to FIG. 5. FIG. 5 is a flowchart illustrating a series of steps in the method of manufacture of the semitransparent lens according to Embodiment 3.

Firstly, a photochromic sheet formed by using two polyamide resin sheets to sandwich a photochromic membrane is punched out in a prescribed shape to form the substrate plate (step S31). Next, the substrate plate is bent to form a prescribed curved surface to form the lens substrate (step S32). Thereafter, this lens substrate is set in the mold such that the convex surface of the lens substrate faces the surface of the mold in which fine irregularities are formed.

Then polyamide resin is injection molded into the backside of the mold, that is to say, the concave surface side of the lens substrate (step S33). By this method, the lens substrate is pressed against the surface of the mold in which the fine irregularities are formed, and thus the fine irregularities are transferred to the convex surface of the lens substrate. The reflection layer is formed on the convex surface of the lens substrate to which the fine irregularities are previously transferred in this manner (step S34). Further, the hard-coat layer is formed on the reflection layer (step S35). The manufacture of the semitransparent lens is completed by the aforementioned processing (step S36).

Here, the hard-coat layer formed on the reflection layer is configured so as to have a refractive index that is nearly the same as the refractive index of the polyamide resin. The hard-coat layer can have any freely-selected composition as long as the refractive index approaches that of the polyamide resin. That is to say, the hard-coat layer may include the primer and a hard coat such as the acrylic hard coat or the like, or the hard-coat layer may include just the primer. Further, the hard-coat layer formed just from the primer may include only one type of the primer, or may include two or more types of the primer. Furthermore, the primer may be formed to have a layered structure.

Embodiment 4

Figure 6:
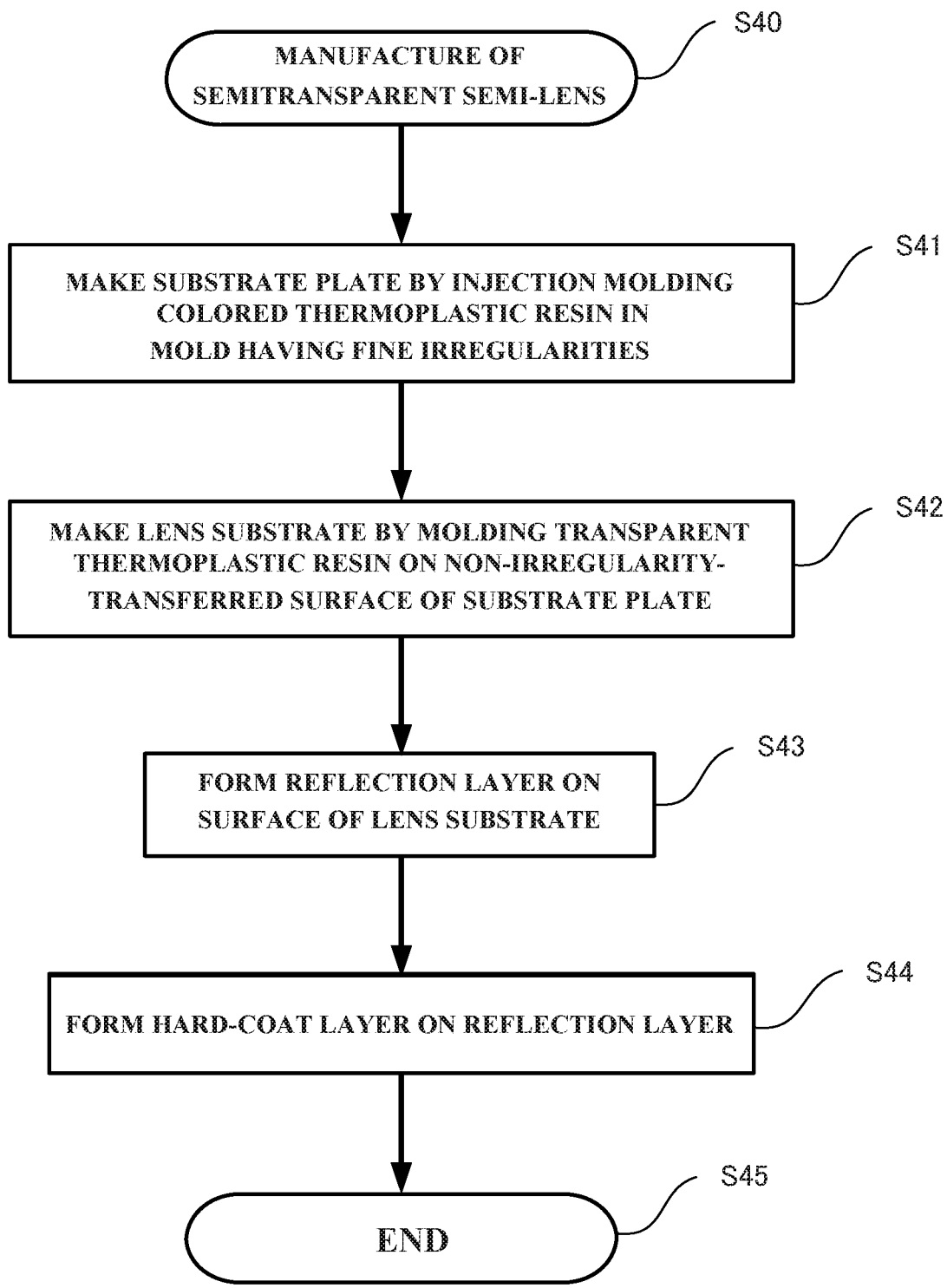
FIG. 6 is a flowchart illustrating a procedure of a semitransparent lens manufacturing method according to Embodiment 4 of the present disclosure.

The semitransparent lens (semitransparent semi-lens) according to Embodiment 4 of the present disclosure is described below with reference to FIG. 6. FIG. 6 is a flowchart illustrating a series of steps in the method of manufacture of the semitransparent semi-lens according to Embodiment 4.

Firstly, a colored thermoplastic resin is injected molded into the mold having the fine irregularities to form the substrate plate (step S41). This mold has a cavity shape that corresponds to the lens shape having the prescribed curved surfaces, and fine irregularities are formed in the surface corresponding to the convex surface side of the lens shape. Thereafter, transparent thermoplastic resin is injection molded at the concave surface side of the substrate plate, that is to say, at the surface that does not transfer the fine irregularities of the mold, to form a lens substrate (step S42).

Furthermore, the reflection layer is formed on the surface of this lens substrate to which the fine irregularities are transferred (that is to say, on the convex surface of the lens substrate) (step S43). Thereafter, the hard-coat layer is formed on the reflection layer (step S44). The manufacture of the semitransparent semi-lens is completed by the aforementioned method (S45).

Here, the hard-coat layer formed on the reflection layer is formed so as to have a refractive index that is nearly the same as that of the colored thermoplastic resin. The hard-coat layer can have any freely-selected composition as long as the refractive index approaches that of the colored thermoplastic resin. That is to say, the hard-coat layer may include the primer and a hard coat such as the acrylic hard coat or the like, or the hard-coat layer may include just the primer. Further, the hard-coat layer formed just from the primer may include only one type of the primer, or may include two or more types of the primer. Furthermore, the primer may be formed to have a layered structure.

EXAMPLES

Examples of the semitransparent lens according to the present disclosure and lens properties are described below in further detail.

Firstly, semitransparent lenses according to Examples 1 and 2 of the present disclosure are described. The semitransparent lenses according to Examples 1 and 2 were manufactured according to the flowchart of FIG. 2 showing the semitransparent lens manufacturing method according to Embodiment 1. That is to say, the semitransparent lenses according to Examples 1 and 2 correspond to the semitransparent lens 11 according to Embodiment 1.

The inner surfaces of the molds used for the manufacture of the semitransparent lenses according to Examples 1 and 2 have mutually different surface roughness values. Corresponding to the surface roughness values of the utilized molds, the surface roughness values of the intermediate products occurring in the subsequently performed respective manufacturing steps had values intrinsic to the respective manufacturing step. Thereafter, these values were reflected finally in the surface roughness values of the semitransparent lenses according to Examples 1 and 2.

Transparent lenses of Comparative Examples 1 to 3 were manufactured by conventional technology as conventional-technology semitransparent lenses for comparison with the semitransparent lenses according to the examples. The inner surfaces of the molds used in the manufacture of the semitransparent lenses of these Comparative Examples 1 to 3 had mutually different surface roughness values.

Five types of molds (molds A, B, C, D, and E) were used as the molds in the manufacturing of the semitransparent lenses illustrated in the flowchart of FIG. 2. The mold A was used in the manufacture of the semitransparent lens according to Example 1, and the mold E was used in the manufacture of the semitransparent lens according to Example 2. Further, the mold D was used in the manufacture of the semitransparent lens of Comparative Example 1, the mold B was used in the manufacture of the semitransparent lens of Comparative Example 2, and the mold C was used in the manufacture of the semitransparent lens of Comparative Example 3.

Method of Measurement of Properties of Semitransparent Lenses

Surface roughness and haze (turbidity) of the lenses were measured under the below conditions as properties of the semitransparent lenses according to Examples 1 and 2 of the present disclosure.

Surface Roughness

A surface roughness measurement device was used to measure the value of surface roughness (Ra) for each process of the semitransparent lenses.

These values of surface roughness directly affected the scattering occurring in the semitransparent lenses (molds A and E) according to Examples 1 and 2, and were reflected in the haze values of the semitransparent lenses. For the semitransparent lenses according to Examples 1 and 2, the measured values are collectively listed in Table 1 for each of the manufacturing stages (after molding, after insert-molding, and after reflection layer formation and hard-coat layer formation).

Further, Table 1 lists for comparison measurement values of the surface roughness for each manufacturing stage for the semitransparent lenses (molds B to D) of Comparative Examples 1 to 3 made by the conventional technology.

Haze

The haze value was measured at each stage of the manufacturing process of the semitransparent lenses (molds A and E) according to Examples 1 and 2 in accordance with ISO 12312-1 according to the test method of ISO 12317.97. The results of measurement of haze at each stage of the manufacturing process of the semitransparent lenses (molds A and E) according to Examples 1 and 2 are listed in Table 1. Further, the JIS K 7136:2000 specification is approximately equivalent to that of ISO 12312-1 and ISO 12317.97, although differences exist in the detailed conditions.

Further, the haze values were measured at each stage of the manufacturing process also for the semitransparent lenses (molds B to D) of Comparative Examples 1 to 3 formed by the conventional technology for comparison. The results of measurements of haze values for the semitransparent lenses (molds B to D) of Comparative Examples 1 to 3 are listed in Table 1.

TABLE 1

| | Process | | | | |
|---|---|---|---|---|---|
| Sample | Mold surface (Ra) | After inert molding of PC polarizing sheet | After hard coat layer forming | Haze (%) | Haze evaluation |
| Example 1 (mold A) | 0.70 | 0.11 | 0.01 | 0.58 | ○ |
| Example 2 (mold E) | 0.45 | 0.05 | 0.01 | 1.80 | ○ |
| Comparative Example 1 (mold D) | 0.62 | 0.08 | 0.01 | 2.30 | Δ |
| Comparative Example 2 (mold B) | 0.84 | 0.19 | 0.02 | 2.70 | X |
| Comparative Example 3 (mold C) | 0.96 | 0.21 | 0.03 | 3.30 | X |

Further, measurement values of surface roughness for the semitransparent lenses according to Examples 1 and 2 (molds A and E) for the other manufacturing processes are collectively listed for reference in Table 2. For comparison, measurement values of surface roughness occurring in the other manufacturing processes are collectively listed in Table 2 also for the semitransparent lens (mold D) of Comparative Example 1 manufactured by the conventional technology.

TABLE 2

| | Process | | | | |
|---|---|---|---|---|---|
| Sample | After rough molding | After rough coating | After molding of non-acrylic-coated polarizing sheet | After reflective layer formation on lens substrate | After acrylic molding |
| Example 1 (mold A) | 83.14 | 8.05 | 61.53 | 3.34 | 4.68 |
| Example 2 (mold E) | 73.7 | 3.64 | 55.84 | 1.72 | 2.89 |
| Comparative Example 1 (mold D) | 85.61 | 10.82 | 61.72 | 4.53 | 7.43 |

Next, the semitransparent lenses according to Examples 3, 4, and 5 of the present disclosure are described. The main point of difference in visual appearance between the semitransparent lenses according to Examples 3 to 5 and the semitransparent lenses according to Examples 1 and 2 is the degree of matte.

As described above, the semitransparent lenses according to Examples 1 and 2 of the present disclosure included the reflection layer that has irregularities indicating the aforementioned surface roughness, the hard-coat layer covering the reflection layer, and the intermediate layer that has the extremely low difference in refractive index relative to the hard-coat layer. Thus, the haze value was controlled at an extremely low value, visibility of the exterior during wearing of the lenses was greatly improved, and the lenses had a matte-colored visual appearance.

Further, although the semitransparent lens of the present disclosure is provided with the hard-coat layer as a protective layer on the surface of the reflection layer, the surface of the reflection layer has the fine irregularities. When the reflection layer has a flat and smooth surface, light entering from the hard-coat layer and then reflecting travels in a round trip through the hard-coat layer along a uniform direction, and thus interference fringes are visible from the exterior.

In contrast, the semitransparent lens according to the present disclosure has the fine irregularities in the surface of the reflection layer, and thus after entering from the hard-coat layer, the light reflects and passes through the hard-coat layer at random angles, and then leaves the hard-coat layer. Thus, occurrence and external visibility of the interference fringes can be reliably prevented. This interference fringe occurrence prevention effect is not limited to the case in which the value of Ra of the reflection layer is greater than or equal to a predetermined magnitude and the semitransparent lens has a distinct matte-colored visual appearance as in Examples 1 and 2, and a similar effect is obtained when the reflection layer has a smaller Ra value.

The matte-colored visible appearance of the semitransparent lens weakens due to lowering of the Ra value of the reflection layer and lowering of the extent of the irregularities. Thus, by adjustment of the Ra value of the reflection layer, a semitransparent lens can be manufactured that has the desired degree of matte coloration while maintaining the interference fringe occurrence prevention effect. The value of Ra of the reflection layer can be adjusted, for example, by changing the magnitude of the irregularities (Ra value) of the mold surface as in Examples 1 and 2.

Two types of molds (molds F and G) were used as the molds for the manufacture of the semitransparent lenses according to Examples 3 to 5. The mold F was used in the manufacture of the semitransparent lens according to Example 3, and the mold G was used in the manufacture of the semitransparent lenses according to Examples 4 and 5.

The values of surface roughness and haze were measured for each stage of the manufacturing process of the semitransparent lenses according to Examples 3 to 5. Specifically, for surface roughness, the value of Ra was measured using a surface roughness measurement device. Further, the haze value was measured according to ISO 12312-1 based on the ISO 12317.97 test method. For each stage of the manufacturing process of the semitransparent lenses according to Examples 3 to 5, Table 3 lists the measurement results for the value of surface roughness and the degree of haze, and whether interference fringes were observed in the obtained semitransparent lenses.

TABLE 3

| | Process | | | | |
|---|---|---|---|---|---|
| Sample | Mold surface (Ra) | Polycarbonate molded surface (Ra) | Polarizing sheet after insert molding (Ra) | Haze evaluation | Interference fringes? |
| Example 3 (mold F) | 0.051 | 0.042 | — | ○ | no |
| Example 4 (mold G) | 0.155 | — | 0.088 | ○ | no |
| Example 5 (mold G) | 0.155 | — | 0.022 | ○ | no |

As indicated by the semitransparent lenses according to Examples 3 to 5, the effect of preventing the occurrence of interference fringes could be obtained even in the case in which the degree of matte visible from the exterior was small when using molds (molds F and G) having small surface irregularities. Thus, a semitransparent lens is produced that has almost the same visible appearance of a matte-free lens without irregularities in the reflective surface, and without the occurrence of interference fringes. Thus, the present disclosure can be applied also to an auto-interior review mirror, for example.

Although embodiments and examples of the present disclosure are described above, the present disclosure is not limited the aforementioned embodiments and examples.

Various changes may be made in form and detail of the various embodiments and examples without departing from the broader spirit and scope of the invention. The various above listed embodiments and examples are to be regarded in an illustrative rather than a restrictive sense.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A semitransparent lens comprising:
    a lens substrate having surface roughness (Ra) on a surface of the lens substrate;
    a reflection layer disposed on the lens substrate;
    a hard-coat layer disposed on the reflection layer; and
    an intermediate layer disposed between the lens substrate and the reflection layer, the intermediate layer being a material having a difference in refractive index less than or equal to 0.03 relative to the hard-coat layer and a surface roughness (Ra), wherein the reflection layer is disposed onto the surface roughness of the intermediate layer;
    wherein a haze value of the semitransparent lens is in a range of 0.4 to 2.5; and
    wherein the reflection layer has a surface roughness (Ra) on i) a surface that comes in contact with the intermediate layer, and ii) a surface that comes in contact with the hard-coat layer.

2. The semitransparent lens according to claim 1, wherein a portion of the surface of the lens substrate is free of the surface roughness (Ra).

3. The semitransparent lens according to claim 1, wherein a difference in refractive index between the hard-coat layer and the intermediate layer is less than 0.02.

4. The semitransparent lens according to claim 1, wherein a visible light transmittance is in a range of 10 percent to 35 percent.

5. The semitransparent lens according to claim 1, wherein the lens substrate comprises at least one resin selected from among a group consisting of a polycarbonate, a poly (methyl methacrylate), a polyamide, a polyester, a polysiloxane, a polystyrene, and a poly(cycloolefin).

6. The semitransparent lens according to claim 1, wherein a thickness of the hard-coat layer is within a range of 2 microns to 4 microns, and the hard-coat layer comprises a primer.

7. The semitransparent lens according to claim 1, wherein the hard-coat layer comprises at least 2 types of primers, and the primers may form a layered structure.

8. Sunglasses comprising the semitransparent lens according to claim 1.

9. A method for manufacture of the semitransparent lens according to claim 1, wherein the method comprises:
    forming the lens substrate having surface roughness (Ra) by inserting a polarizing sheet into a mold for forming a surface having surface roughness (Ra) on the lens substrate and thereafter insert molding a thermoplastic resin;
    forming the reflection layer on the lens substrate having the surface roughness (Ra) formed thereon;
    forming at least the hard-coat layer on the reflection layer; and
    wherein the reflection layer has a surface roughness (Ra) on i) a surface that comes in contact with the intermediate layer, and ii) a surface that comes in contact with the hard-coat layer.

10. The method according to claim 9, wherein the forming of the lens substrate having the surface roughness (Ra) comprises:
    by molding pressure during insert molding of the thermoplastic resin, pressing the polarizing sheet inserted in the mold against the inner surface of the mold to press the polarizing sheet against the inner surface of the mold having irregularities corresponding to the surface roughness (Ra) to transfer the surface roughness (Ra) to the surface of the polarizing sheet.

11. The method according to claim 10, further comprising:
    forming a layer of the thermoplastic resin having the difference in refractive index relative to the hard-coat layer less than or equal to 0.03 at a surface side of the mold having the irregularities corresponding to the surface roughness (Ra) of the polarizing sheet.

12. A method for manufacture of the semitransparent lens according to claim 1, wherein the method comprises:
    molding the thermoplastic resin to form the lens substrate using the mold having an inner surface shape for forming the surface roughness (Ra) in the surface of the lens substrate;
    forming the reflection layer on the surface of the molded lens substrate having the surface roughness (Ra) formed thereon; and
    forming at least the hard-coat layer on the reflection layer.

13. The method according to claim 12, further comprising:
    forming, between the lens substrate and the reflection layer, an intermediate layer having a difference in refractive index less than or equal to 0.03 relative to the hard-coat layer.

* * * * *